United States Patent Office 3,119,700
Patented Jan. 28, 1964

3,119,700
METHOD FOR KEEPABLY PACKING DRIED AND RESOAKED FRUIT IN FOILS
Otto John Wouters, Bussum, Netherlands, assignor to N. V. Maasveem, Rotterdam, Netherlands, a limited liability of the Netherlands
No Drawing. Filed Mar. 14, 1960, Ser. No. 14,549
Claims priority, application Netherlands Apr. 1, 1959
7 Claims. (Cl. 99—204)

The invention relates to the packing of dried and subsequently pre-soaked fruit in a preservable way.

Since time immemorial fruit have been made preservable by means of drying, more particularly in southern countries. By drying in the open or by some artificial method so much water is removed, until an equilibrium of the moisture content is reached. At the normal relative moisture of 70% this content amounts to 20–25%, in dependency on the kind of fruit. Fruit dried in this manner, provided it is stored in a dry and cool place, may be kept practically unchanged for several months at least. No microbial decay occurs.

This kind of fruit can, however, not be consumed as they are, as they usually are hard, tough and dry. Therefore, before they are used, they are allowed to simmer in a suitable amount of water and, if desired, they are subsequently cooked until they are done. The fruits that are swollen by the addition of water should be worked up at once, as the micro-organisms present on the surface of the fruits immediately start multiplying and thereby within a short time render the fruits unfit for human consumption.

It is known in the art how to make prunes that have been wetted with water or steam and packed in tins preservable by means of sterilization.

Fruits with an increased moisture content can also be made preservable by candying (by increasing the sugar content).

It is also known how to pack dried fruits or candied fruit in bags of various foil materials.

The object of the invention is to provide for ready-to-eat fruits wrapped in non-metal foils, which can be stored at room-temperature.

The invention consists in that dried fruits which have been prewetted with water are packed in an airtight and watertight manner in transparent foil material and are subsequently preserved by heating them with non-ionizing rays.

This heating may be effected with the aid of a high frequency radiation source, but the fruits are preferably treated with infra-red rays which may be produced, for instance, by heat radiation elements such as infra-red lamps, reflector fire elements, etc. The wetting or pre-soaking is preferably carried on up to a moisture content of from 35 to 50%, depending on the type of fruits treated.

In order that dried fruits may be suitable for immediate use, the water content should be increased. In prunes for instance, as I have found, a moisture content of about from 35–40% is desirable for the obtaining of a pleasant consistency, in apricots a content of from 42 to 45%, in apple slices on the other hand up to 80% of moisture can be applied. Analogous conditions are found in for instance peaches, figs, cherries, currants and raisins. The moisture content of such pre-soaked fruits is substantially higher than the relative equilibrium moisture content so that, unless further precautions are taken, they are in a very short time rendered unpalatable by the growth of fungi or by fermentation.

Infra-red ray treatment, when applied, should preferably be of such intensity, as to have the temperature within the fruit quickly reach the required minimum of 70° C. A good result may often be attained with a heating period of from 4 to 8 minutes. An advantageous arrangement is for the desired result to produce the desired effect by means of ray treatment during about five minutes applied on either side of the packed product. The risks of caramelization and undesired discolorations, particularly important in fruits of a light colour such as apricots and sliced apples, have in this way been reduced to a minimum. The germ content after this treatment amounts to less than 10 per g., as against an original content of about $10^{12}$ per g.

In order to prevent the development of the surviving micro-organisms, a slight amount of a preservative may be added, for instance sodium benzoate in the usual low concentrations. The heat treatment should be followed by rapid cooling in order to prevent the packed fruits which have been pre-cooked by means of the treatment just described from getting overheated.

The foil used in packing should be thermostable and impervious to moisture. A good thermostable foil is for instance a foil consisting of polyamide, polyester, polyvinyl chloride, or also a foil of regenerated cellulose covered with a thin layer of one of the substances mentioned.

Fruits which have been packed and treated according to the invention, can be kept for several weeks at normal temperatures without losing their quality.

Example I 100 kg. of dried prunes having a moisture content of 25% are sprinkled with 15 kg. of water. After all of this moisture has been absorbed by the fruits, the bags of transparent foil material are filled with portions of for instance 200 g. and closed airtight by heat sealing. The foil material used consists of regenerated cellulose, covered with a commercially available mixture of polyvinyl chloride and polyvinylidene chloride (known under the trade name of "Saran"). Subsequently the bag with its contents is for five minutes given infra-red ray treatment on both sides in such a manner, that the final temperature in the fruit cores amounts to at least 70° C. After this temperature has been reached rapid cooling is effected.

The right intensity for the irradiation source had been pre-established with the aid of thermoelements which had been arranged in fruits of the same type.

The heating element used was composed of two series of elongated heating elements of about 600 watts, one series being placed some 10 to 20 cm. above, the other series underneath an endless belt of metal gauze, on which the bags were passed between said elements at the required velocity.

The product obtained appeared to be well-preserved after storage for a few weeks at room temperature, no signs of a deterioration in either smell or taste being noticeable. The prunes pre-cooked and preserved in this manner can be worked up in the food, if desired, without any further cooking treatment.

Example II

Apricots having a moisture content of 22% are treated in the same manner as in Example I. The moisture content is brought up to 45%. The duration of the ray treatment is kept at five minutes (on both sides). The apricots obtained in this manner are of a pleasant edible consistency and ready for immediate consumption.

After storage at room temperatures for one month, the apricots were of the same quality as immediately after the treatment.

Example III

Sliced apples (moisture content 24%) were treated as indicated in Example I and given ray treatment during about 5 minutes after having been previously brought up to 43% of moisture. During this process the colour has remained substantially identical.

The products could be stored for several weeks before any deterioration could be observed or proved.

I claim:

1. A process for preservably packing dried and subsequently re-hydrated fruit, comprising soaking dried fruit with water until the moisture content of the fruit is about 35 to 80% by weight, enclosing the resulting re-hydrated fruit in which all the moisture is absorbed, air- and water-tight in substantially tarnsparent thermostable, water-impervious foil material, subjecting the sealed enclosure and fruit therein to non-ionizing irradiation for about 5 to 8 minutes until the core of the enclosed fruit is heated to at least 70° C., thereby substantially sterilizing the enclosed food; and rapidly cooling the enclosure and food therein.

2. A process for preservably packing dried and subsequently re-hydrated fruit, comprising soaking dried fruit with water until the moisture content of the fruit is about 35 to 80% by weight, enclosing the resulting re-hydrated fruit in which all moisture is absorbed, air- and water-tight in substantially transparent thermostable, water-impervious polyamide foil material, subjecting the sealed enclosure and fruit therein to non-ionizing irradiation for about 5 to 8 minutes until the core of the enclosed fruit is heated to at least 70° C., thereby substantially sterilizing the enclosed food; and rapidly cooling the enclosure and food therein.

3. A process for preservably packing dried and subsequently re-hydrated fruit, comprising soaking dried fruit with water until the moisture content of the fruit is about 35 to 80% by weight, enclosing the resulting re-hydrated fruit in which all moisture is absorbed, air- and water-tight in transparent thermostable, water-impervious polyester foil material, subjecting the sealed enclosure and fruit therein to non-ionizing irradiation for about 5 to 8 minutes until the core of the enclosed fruit is heated to at least 70° C., thereby substantially sterilizing the enclosed food; and rapidly cooling the enclosure and food therein.

4. A process for preservably packing dried and subsequently re-hydrated fruit, comprising soaking dried fruit with water until the moisture content of the fruit is about 35 to 80% by weight, enclosing the resulting re-hydrated fruit in which all the moisture is absorbed, air- and water-tight in transparent thermostable, water-impervious polyvinyl chloride foil material, subjecting the sealed enclosure and fruit therein to non-ionizing irradiation for about 5 to 8 minutes until the core of the enclosed fruit is heated to at least 70° C., thereby substantially sterilizing the enclosed food; and rapidly cooling the enclosure and food therein.

5. A process for preservably packing dried and subsequently re-hydrated fruit, comprising soaking dried fruit with water until the moisture content of the fruit is about 35 to 80% by weight, enclosing the resulting re-hydrated fruit in which all the moisture has been absorbed, air- and water-tight in transparent thermostable, water-impervious regenerated cellulose foil material, covered with a mixture of polyvinyl chloride and polyvinylidene chloride, subjecting the sealed enclosure and fruit therein to non-ionizing irradiation for about 5 to 8 minutes until the core of the enclosed fruit is heated to at least 70° C., thereby substantially sterilizing the enclosed food; and rapidly cooling the enclosure and food therein.

6. A process for preservably packing dried and subsequently re-hydrated fruit, comprising soaking dried fruit selected from the group consisting of prunes, apricots, peaches, figs, cherries, currants and raisins, with water until the moisture content of the fruit is about 35 to 80% by weight, enclosing the resulting re-hydrated fruit in which all the moisture is absorbed, air- and water-tight in substantially transparent thermostable, water-impervious foil material, subjecting the sealed enclosure and fruit therein to non-ionizing irradiation for about 5 to 8 minutes until the core of the enclosed fruit is heated to at least 70° C., thereby substantially sterilizing the enclosed food; and rapidly cooling the enclosure and food therein.

7. A process for preservably packing dried and subsequently re-hydrated fruit, comprising soaking dried fruit with water until the moisture content of the fruit is about 35 to 80% by weight, enclosing the resulting re-hydrated fruit air- and water-tight in substantially transparent thermostable, water-impervious foil material, subjecting the sealed enclosure and fruit therein to non-ionizing infra-red irradiation of an intensity corresponding to that of an infra-red radiation emitting element of about 600 watts placed at a distance of from about 10 to 20 centimeters for about 5 to 8 minutes until the core of the enclosed fruit is heated to at least 70° C., thereby substantially sterilizing the enclosed food; and rapidly cooling the enclosure and food therein.

References Cited in the file of this patent

UNITED STATES PATENTS

| | | |
|---|---|---|
| 2,401,131 | Bensel | May 28, 1946 |
| 2,785,623 | Graham | Mar. 19, 1957 |
| 2,929,150 | Johnston | Mar. 22, 1960 |